United States Patent
Bohbot et al.

(10) Patent No.: US 11,416,652 B2
(45) Date of Patent: Aug. 16, 2022

(54) SYSTEM AND METHOD FOR PREDICTING A PHYSICAL AND/OR CHEMICAL PHENOMENON BY MEANS OF A SHARED MEMORY SEGMENT

(71) Applicant: IFP Energies nouvelles, Rueil-Malmaison (FR)

(72) Inventors: Julien Bohbot, Rueil-Malmaison (FR); Nicolas Gillet, Rueil-Malmaison (FR); Anthony Velghe, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 855 days.

(21) Appl. No.: 16/275,765

(22) Filed: Feb. 14, 2019

(65) Prior Publication Data
US 2019/0258758 A1     Aug. 22, 2019

(30) Foreign Application Priority Data
Feb. 19, 2018   (FR) ..................................... 18/51.397

(51) Int. Cl.
*G06F 30/20*     (2020.01)
*G06F 15/167*    (2006.01)
*G06F 111/10*    (2020.01)

(52) U.S. Cl.
CPC ............ *G06F 30/20* (2020.01); *G06F 15/167* (2013.01); *G06F 2111/10* (2020.01)

(58) Field of Classification Search
None
See application file for complete search history.

(56) References Cited

U.S. PATENT DOCUMENTS

| 4,642,755 | A | * | 2/1987 | Hinch | ................... G06F 15/167 |
| | | | | | 711/147 |
| 2003/0009532 | A1 | | 1/2003 | Otte | |
| 2011/0246406 | A1 | * | 10/2011 | Lahav | ..................... G06N 20/00 |
| | | | | | 706/46 |
| 2013/0197890 | A1 | * | 8/2013 | Ide | ...................... G01C 21/3484 |
| | | | | | 703/6 |

FOREIGN PATENT DOCUMENTS

| EP | 0149355 A2 | 7/1985 |
| EP | 2447853 A1 | 5/2012 |
| JP | S5975350 A | 4/1984 |
| WO | 89/08886 A1 | 9/1989 |
| WO | 2012/134557 A1 | 10/2012 |

* cited by examiner

*Primary Examiner* — Craig C Dorais
(74) *Attorney, Agent, or Firm* — Fitch, Even, Tabin & Flannery LLP

(57) ABSTRACT

The present invention relates to a system and method for predicting (simulating) at least one of a physical and chemical phenomenon on processors, each having computing cores. The system and method further includes a random-access memory including memory segments. The invention is based on the use of a table of numerical data that is stored in a single random-access memory segment that is "shared" between all of the cores.

18 Claims, 2 Drawing Sheets

SYSTEM AND METHOD FOR PREDICTING A PHYSICAL AND/OR CHEMICAL PHENOMENON BY MEANS OF A SHARED MEMORY SEGMENT

CROSS REFERENCE TO RELATED APPLICATIONS

Reference is made to French Application No. 18/51.397 filed Feb. 19, 2018, which is incorporated herein by reference in its entirety.

BACKGROUND OF THE INVENTION

Field of the Invention

The present invention relates to computer systems and methods for predicting a physical and/or chemical phenomenon, in particular for predicting the combustion and pollution emissions of a vehicle having an internal combustion engine.

Description of the Prior Art

The economical and environmental constraints on fuel consumption and pollution emissions are becoming increasingly restrictive for motor vehicle manufacturers. For example, the European emission standards setting the maximum limit for the pollution emissions of vehicles ($CO_2$, $NO_x$, soot, particulates and unburnt hydrocarbons) are becoming increasingly restrictive. Manufacturers are therefore seeking to optimize their vehicles, with a view toward minimizing pollution emissions. Pollution emission simulations are therefore finding increasing use in predicting the behaviour of the engine without having to carry out numerous and time-consuming experimental measurements.

In order to predict the pollution emissions of vehicles, the post-oxidation phase (that is the oxidation of the gases by a diffusion flame) in the combustion chamber may be simulated by a FPI (flame prolongation of intrinsic low-dimensional manifold) chemical kinetics tabulation method or an ADF-PCM (approximated diffusion flame-presumed conditional moment) combustion model. The tables of numerical data used for this type of model may be generated on the basis of a computer code for solving for the chemical kinetics, for example the Chemkin™ software developed by Reaction Design or the IFP-Kinetics™ software developed by IFP Energies Nouvelles, or by flamelet calculations for the structure of the flame for PCM methods. This tabulation details the molar quantities for all of the chemical compounds present in a reaction according to a given reaction scheme and thermodynamic conditions. Next, these tables are used in the computation of the pollution emissions by a computer program, for example a CFD (computational fluid dynamics) program, in particular using the IFP-C3D® software developed by IFP Energies Nouvelles.

However, a number of drawbacks relating to these tabulation methods should be noted. In order to take into account a set of thermodynamic pathways and physical-chemical processes, additional input and output variables must be entered into the tables. This increased number of parameters results in an increase in the size of the physical-chemical tables, which may quickly become incompatible with the memory capacity of the computers once the model has been implemented in a parallel solver using the MPI (message-passing interface) paradigm. The use of this distributed-memory paradigm organizes communications around the transmission and reception of messages between processes. The memory zones for the processes are exclusive and segmented in the random-access memory RAM. The physical-chemical tables are large in size, and may represent several gigabytes. For example, a table generated for the PCM model represents more than 3.5 GB of data.

FIG. 1 schematically shows such an operation according to the prior art. A computer system 1 includes a plurality of (here four) processors 3 and a random-access memory 5. Each processor 3 is a multicore processor. According to the example shown, each processor 3 includes four computing cores 4. The random-access memory 5 includes a plurality of memory segments 6 (16 segments in the case shown). The term "segment" refers to a memory zone of the random-access memory (straight arrows). For this configuration, the table 2 is allotted to each segment 6 of the random-access memory. The cores 4 of each processor 3 are intended to run computations in parallel. To achieve this, each core 4 reads the data stored in the table 2 from a segment 6 that is specific to said core.

For the operation in FIG. 1, the table is allotted to each segment of each parallel process. Thus, the computer system requires a random-access memory with a large capacity, and needs to make heavy use of this random-access memory. It should be noted that the forecast growth of computers for intensive computing will not allow this storage problem to be overcome. Specifically, the projections of manufacturers regarding the growth of computers suggests an increased number of computing cores with a small amount of memory per processor, with a relatively small increase in the number of processors per computing node. This type of architecture is recommended to decrease the power consumption of future computers.

Currently, in a parallel simulation making use of a tabulation method, each process loads the entirety of the table into the memory. For example, a simulation on a node using of a processor containing eight computing cores will load eight data tables (processes) of several gigabytes (for example 3.5 GB) of data related to reading the table. This memory overload will considerably limit the amount of memory remaining for loading the mesh and other tables allocated over the course of the simulation.

A similar problem may be encountered in other fields involving the simulation of physical and/or chemical phenomena, in particular in the field of complex-fluid reactive flow simulations (nuclear industry, energy process, etc.).

In order to overcome this problem, the present invention relates to a prediction (simulation) method and system allowing memory consumption to be dramatically decreased through the use of a single random-access memory segment "shared" between all of the parallel cores.

SUMMARY OF THE INVENTION

The present invention relates to a computer system for predicting at least one of physical and chemical phenomenon, comprising a plurality of multicore processors for parallel computing and a random-access memory including a plurality of memory segments. The prediction of at least one of physical and chemical phenomenon is made by means of computations performed based on at least one table storing numerical data. The random-access memory comprises a single shared segment in which the table of numerical data is stored, and each core of each processor is configured to communicate with the shared segment to read the table of numerical data in order to perform the computations for predicting the at least one of the physical and chemical phenomenon.

Advantageously, the at least one of physical and chemical phenomenon is a combustion and pollutant emission phenomenon of a vehicle having an internal combustion engine.

According to one embodiment, the table of numerical data is generated based on at least one of a chemical kinetics code and flamelet computations for the structure of a flame.

According to one implementation, each core of each processor is configured to read the table of numerical data of the shared segment by use of a message-passing interface MPI.

Advantageously, the system performs parallelizing said computations between said processors and/or said cores of said processors.

According to one aspect, said processors are configured to run computational fluid dynamics codes for predicting at least one of the physical and chemical phenomenon.

Furthermore, the invention relates to a method for predicting at least one of a physical and chemical phenomenon by use of a computer system according to one of the preceding features and a table of numerical data storing data that are used to predict at least one of the physical and chemical phenomenon. For this method, the following steps are implemented:
a) the table of numerical data is allocated to a single shared segment of the random-access memory; and
b) at least one of the physical and chemical phenomenon is predicted by calculating at least one physical and chemical computations using a plurality of cores of the plurality of processors of the system by use of the table of numerical data, each core communicates with the shared segment to read the table.

Advantageously, at least one of the physical and chemical phenomenon is a combustion and pollution emission phenomenon of a vehicle having an internal combustion engine.

According to one embodiment, the method includes a prior step of generating the table of numerical data based on at least one of chemical kinetics code and flamelet computation code to determine the structure of a flame.

According to one implementation, an identifier is allocated to the shared segment which identifier is sent to the cores of the processors, and a pointer from the processors to the shared segment is assigned by use of the identifier.

According to one aspect, fluid dynamics computations are run on the cores of the processors in order to predict at least one of the physical and chemical phenomenon.

Advantageously, at least one of the physical and chemical computations are run in parallel between at least one of the processors and the cores.

Preferably, the cores read the table of numerical data on the shared segment by use of an MPI function.

BRIEF DESCRIPTION OF THE DRAWINGS

Other features and advantages of the method according to the invention will become apparent upon reading the following description of nonlimiting exemplary embodiments with reference to the appended figures described below.

DETAILED DESCRIPTION OF THE INVENTION

The present invention relates to a computer system for predicting (simulating) at least one of a physical and chemical phenomenon. The prediction (simulation) is made (performed) by computations run on multicore processors. Additionally, the prediction uses a random-access memory (RAM) for storing data. These computations use at least one table storing numerical data.

The computer system defined in the invention is also described as a computing node. It may be a computing node of a supercomputer, that is a portion of a supercomputer. Thus, a supercomputer may be formed by an assembly of computer systems according to the invention.

A multicore processor is a processor having of physical computing cores running simultaneously. It differs from older architectures in which a single processor would control a plurality of simultaneous computing circuits.

A physical computing core is a set of circuits that are capable of running programs autonomously. All of the functionalities required for running a program are present in these cores which are program counter, registers, computing units, etc. Moreover, caches are defined for each processor or shared among them.

Figure 1:
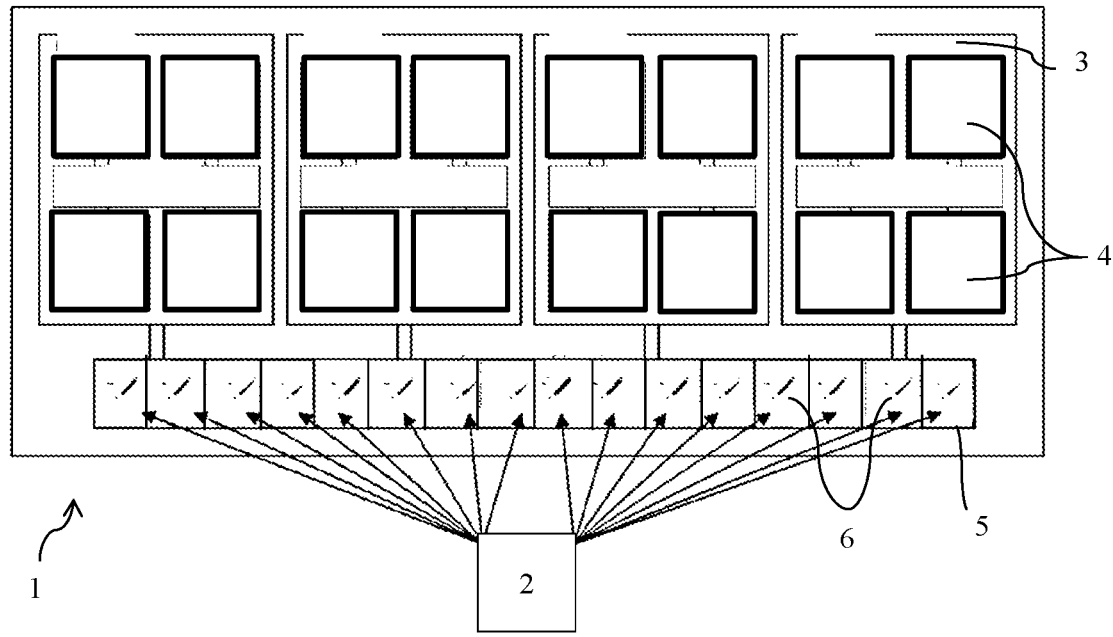
FIG. 1, described above, illustrates a computer system according to the prior art.

The random-access memory is the computer memory in which the information processed by a computer may be stored and from which it may subsequently be erased. The random-access memory includes a plurality of storage zones which are reported to memory segments. According to some existing configurations and as illustrated in FIG. 1, a single memory segment may be associated with a single processor core.

The table is a matrix grouping numerical data together. These data may be the result of preceding computations. According to one exemplary embodiment, the preceding computations may have been run on the same processors.

According to the invention, the random-access memory comprises a single shared memory segment in which the table of numerical data is stored with the other segments of the random-access memory not storing a table of numerical data. Additionally, each core of each processor is configured to communicate with the shared segment so as to read the table of numerical data in order to run the computations for predicting at least one of the physical and chemical phenomenon. In other words, only one of the memory segments of the random-access memory are used to store the table of numerical data and all of the cores read the table of numerical data in the shared memory segment.

The invention makes decreasing the memory utilization of software processes, and, furthermore, makes possible increasing the available random-access memory capacity. Specifically, the invention makes possible predicting (simulate) at least one of a physical and chemical phenomenon while limiting the use of the random-access memory to a single shared memory segment. The invention makes possible increasing utilization of large tables of numerical data, and it also makes possible using processors having low power consumption (with computing cores having a small amount of memory per processor). Moreover, limiting the load on the memory in this way allows memory to be freed for loading the mesh and other tables allocated over the course of the simulation.

In particular, the invention relates to the use of at least one chemical and physical tables of large size in distributed-memory parallel computers. In this case, the invention decreases the memory utilization for software processes that are parallelized on computers having computing nodes based on multicore processors when using physical-chemical tables of large size.

Preferably, the invention relates to predicting the combustion and pollution emissions of a vehicle having an internal combustion engine. Specifically, this application uses tables of large size (of several gigabytes for example for tables generated based on computer code for solving chemical kinetics, or by flamelet calculations for the structure of the flame for PCM methods), for processing of fluid dynamics computations.

However, the invention is suitable for any prediction (simulation) requiring at least one of chemical and physical tables of large size, such as for example in the field of complex-fluid reactive flows (nuclear industry, energy process, etc.).

According to one embodiment of the invention, a table of numerical data may be generated based on chemical kinetics code, such as the Chemkin™ software developed by Reaction Design or the IFP-Kinetics™ software developed by IFP Energies Nouvelles. Software of these types are capable of solving a substantial number of combinations of chemical reactions to provide an understanding of a complex problem, and are therefore suited for example application of determining pollution emissions.

Alternatively or in addition, a table of data may be generated based on flamelet calculations for the structure of the flame for PCM methods.

According to one implementation of the invention, the processors may be configured to run computational fluid dynamics (CFD) codes for predicting at least one of the physical and chemical phenomenon. These codes make it possible in particular to simulate the combustion and emissions of a vehicle fitted with an internal combustion engine based on a table of numerical data resulting from at least one of chemical kinetics code and a flamelet computation code.

The IFP-C3D® software developed by IFP Energies Nouvelles is an example of CFD software which is applicable to the three-dimensional (3D) simulation of reactive two-phase (gas/liquid fuel) flows in internal combustion engines. This software makes it possible to analyse the complex physical phenomena taking place in engines (scavenging due to valve overlap, formation of liquid films on walls, formation of pollutants, etc.).

According to one aspect of the invention, the system may comprise utilization of parallelizing the computations between at least one of the processors and between the cores. In this way, the computations, and hence the predictions (simulations) of at least one of physical and chemical phenomena are faster, thereby decreasing the time that the processors and the random-access memory are in use. The parallelizing of computations may use the message-passing interface MPI.

The message-passing interface MPI is a standard library of functions, which can be used with the C and Fortran languages. It allows remote computers or multiprocessors to be used through message passing. This technique is commonly used to run parallel programs on distributed-memory systems.

MPI has the advantage of providing good performance levels both on shared-memory in use with massively parallel computers and on distributed-memory heterogeneous computer assemblies. Furthermore, it is available on a very wide range of hardware and operating systems. Thus, the MPI has the advantage, with respect to other message-passing libraries, of being widely portable, since MPI has been implemented in nearly all memory architectures, and it is fast because each implementation has been optimized for the hardware on which it is run.

Advantageously, each core of each processor may be configured to read the table of the shared segment by use of a message-passing interface MPI.

Figure 2:
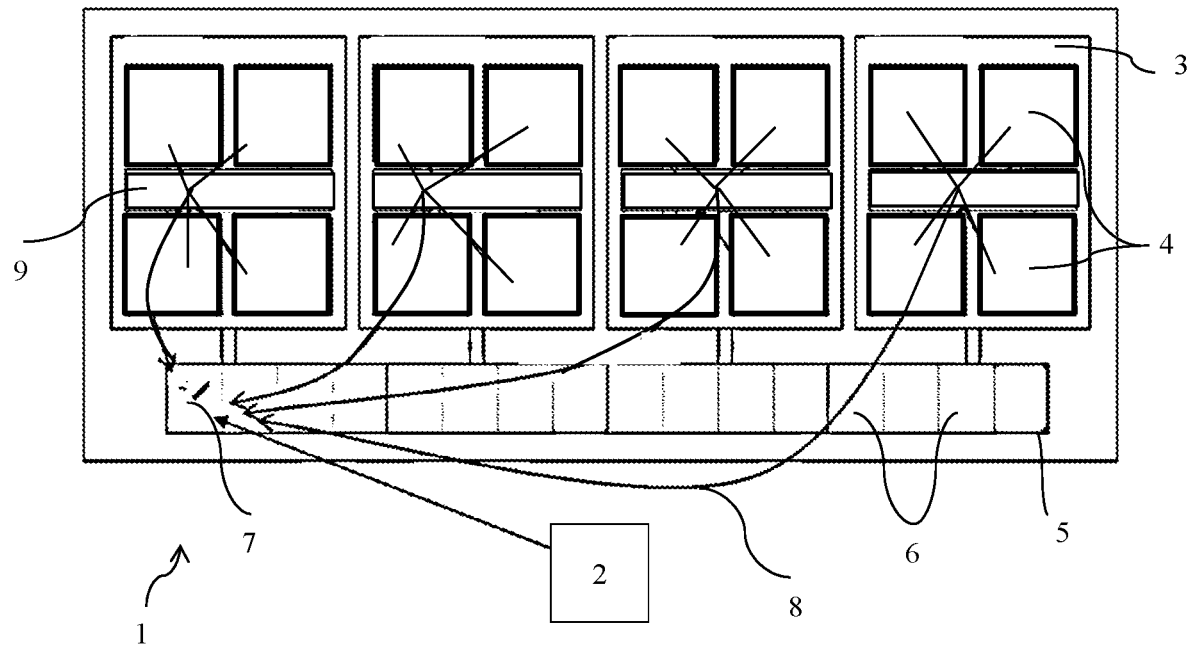
FIG. 2 illustrates a computer system according to one embodiment of the invention.

FIG. 2 schematically and nonlimitingly shows a computer system according to one embodiment of the invention. The representation in FIG. 2 is similar to that in FIG. 1. A computer system 1 includes a plurality of (here four) processors 3 and a random-access memory 5. Each processor 3 is a multicore processor. According to the example shown, in FIG. 2 each processor 3 includes four cores 4 and a cache 9. The random-access memory 5 includes a plurality of segments 6 (16 segments in the case shown). The "segment" is a memory zone of the random-access memory. For this configuration, the table 2 is allocated to a single shared segment 7 of the random-access memory (straight arrow). The cores 4 of each processor 3 are intended to run computations in parallel. To achieve this, each core 4 reads the data stored in the table 2 in the shared segment 7. Each cache 9 of each processor 3 includes a pointer 8 that is configured to read the table 2 in the shared segment 7. Within each processor 3, the cores 4 retrieve the data from the cache 9 taken from the shared segment 7 by the pointer 8 (curved arrows).

Furthermore, the invention relates to a method for predicting (simulating) at least one of a physical and a chemical phenomenon. The method implements a computer system (computing node) according to any combination of the variants described above. Moreover, the prediction method uses a table storing numerical data.

For this method, the following steps are implemented:

a) the table of numerical data is allocated to a single memory segment of the random-access memory of the computer system; and b) at least one of a physical and chemical phenomenon is predicted (simulated) by running physical and chemical computations on a plurality of cores of the plurality of processors of the computer system by use of the table of data. To achieve this, each core of each processor communicates with the shared segment to read the table of numerical data.

Thus, the method according to the invention makes it possible to predict (simulate) at least one of a physical and a chemical phenomenon while limiting the use of the random-access memory to a single memory segment.

Preferably, the method according to the invention relates to predicting (simulating) the combustion and pollutant emissions of a vehicle having an internal combustion engine. Specifically, this application uses tables of large size (of several gigabytes for example for tables generated based on a computer code for solving at least one of chemical kinetics, or flamelet computations for the structure of the flame for PCM methods), for running fluid dynamics computations.

However, the method according to the invention is suitable for any prediction (simulation) requiring at least one of chemical and a physical table of large size, for example in the field of complex-fluid reactive flows (nuclear industry, energy process, etc.).

According to one embodiment of the invention, the method may include a prior step of generating the table of data based on a chemical kinetics code, such as the Chemkin™ software developed by Reaction Design or the IFP-Kinetics™ software developed by IFP Energies Nouvelles.

Alternatively or in addition, the method may include a prior step of generating the table of data based on flamelet computations for the structure of the flame for PCM methods.

According to one implementation of the invention, computational fluid dynamics (CFD) codes may be run for step b) to predict at least one of the physical and chemical phenomenon. These codes make it possible in particular to simulate the combustion and emissions of a vehicle having an internal combustion engine.

According to one aspect of the invention, at least one of the physical and chemical computations may run in parallel between at least one of the processors and the cores. In this way, the computations, and hence the predictions of physical and chemical phenomenon are faster, thereby making it possible to decrease the time for which the processors and the random-access memory are in use. This parallelization may be implemented by use of the message-passing interface MPI.

Advantageously, each core of each processor may be configured to read the table in the shared segment by use of a message-passing interface MPI.

According to one feature of the invention, the method may include the following steps prior to step b) of predicting at least one of the physical and chemical phenomenon:
an identifier is allocated to the shared segment;
the identifier is sent to the cores of the processors;
a pointer from the processors (from the cache of each processor) to the shared memory segment is assigned by use of the identifier allocated to the shared segment.

These steps may be implemented by at least one processor core, which is considered to be the "master" processor core.

These steps allow the processors to be associated with the shared memory segment in a straightforward manner with the pointer subsequently being used by the processor cores to read the table of numerical data.

The system and method according to the invention may operate with any type of operating system, for example Windows™, UNIX™, and IOS™.

Exemplary Algorithm for Implementing the Invention

The algorithm below describes, in a nonlimiting manner, one implementation of the invention in a computing code on a LINUX OS.

Subsequent to the parallel execution of the simulator, the memory initialization of each process must be carried out, it is necessary beforehand:

1—To compute the affinity of the processes in order to associate each of the parallel processes with the computing nodes (computer systems) on which they are run.

For each group of processes, one process will be considered to be the "master" process (one of the processor cores is considered to be the master for memory allocation).

2—For each group of processes run on the same computing node, the following steps are implemented:
On the master process of the group:
2.1—Creation of a shared memory segment by the master process that is authenticated using a unique key called the IDKEY.
2.2—Allocation of a memory zone (using the C memory allocation function, which function is implemented within the C kernel).
2.3—Association of the memory zone with the IDKEY-authenticated shared memory segment through the use of the shmat function (which function is implemented within the C kernel) by the "master" process.
2.4—Sharing the value of IDKEY with all of the other processes of the group.
For the other, non-master processes of each group:
2.5—Reception of the IDKEY authentication key from the master.
2.6—Retrieval of the address of the shared memory segment through the use of the shmget function (which function is implemented within the C kernel).
2.7—Assignment of a (unallocated) C pointer pointing to the shared memory segment.
3—Read/Write table:
3.1—Each master process of each group reads and stores the physical-chemical table in the memory.
3.2—Each non-master process reads the values from the table using the local pointer that points to the shared segment.

Comparative Examples

The features and advantages of the invention will become apparent from the comparative examples described below.

In Table 1, the memory reduction obtained by the invention with respect to use according to the prior art (illustrated in FIG. 1) is estimated according to various actual intensively parallel supercomputer architectures. In Table 1, the gain factor corresponds to the ratio of the memory consumption used by a system according to the prior art (allocation of the table of data to each segment of the random-access memory) to the memory consumption used by the system and method according to the invention (allocation of the table of numerical data to a single shared segment of the random-access memory).

TABLE 1

Memory gain factor for computing nodes

| Example No. | Computing node features | Gain factor |
|---|---|---|
| 1 | 2 eight-core Intel ® Sandy Bridge EP processors | 16 |
| 2 | 16 eight-core Intel ® Xeon processors | 128 |
| 3 | Intel ® Xeon ® E5-2680 v4 processor | 28 |
| 4 | 4 Intel ® Sandy Bridge processors | 32 |
| 5 | 2 eight-core AMD Opteron ® processors | 16 |

The decrease in memory consumption depends on the architecture of the machine. It is notable that the system and method according to the invention allow a substantial memory gain factor (ranging from 16 to 128).

However, for exascale machines, the number of cores per computing node could exceed 256 (eight processors with 32 cores) and 1024 cores by 2020 (eight processors with 128 cores), which will increase the gain factor (to 256 and 1024, respectively).

Figure 3:
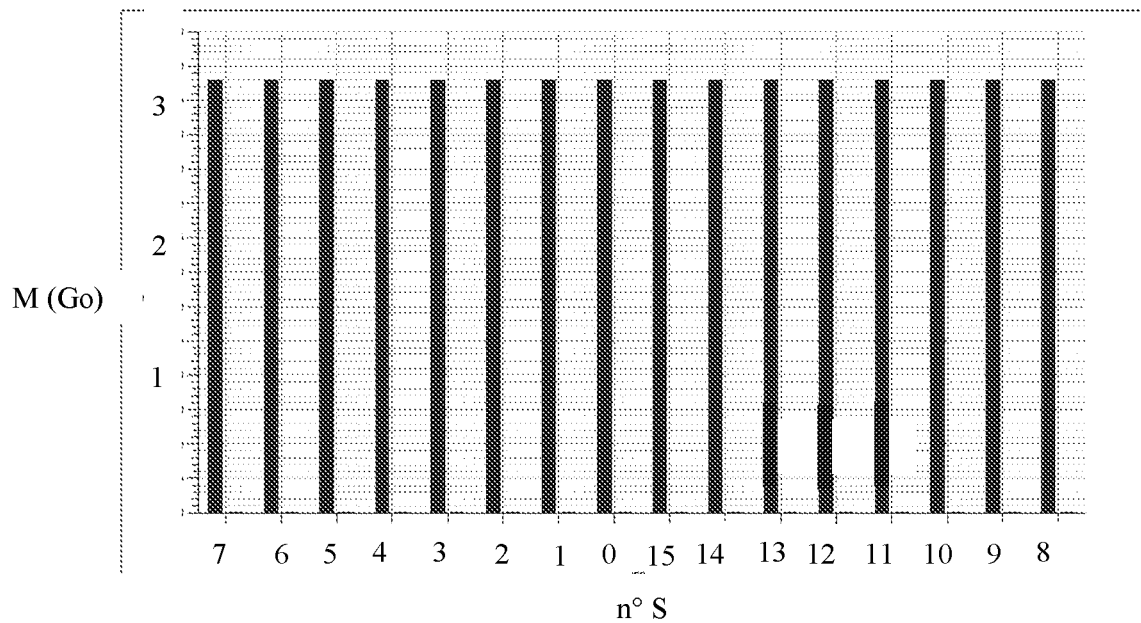
FIG. 3 is a histogram showing the memory used for an example with the system of the prior art.
Figure 4:
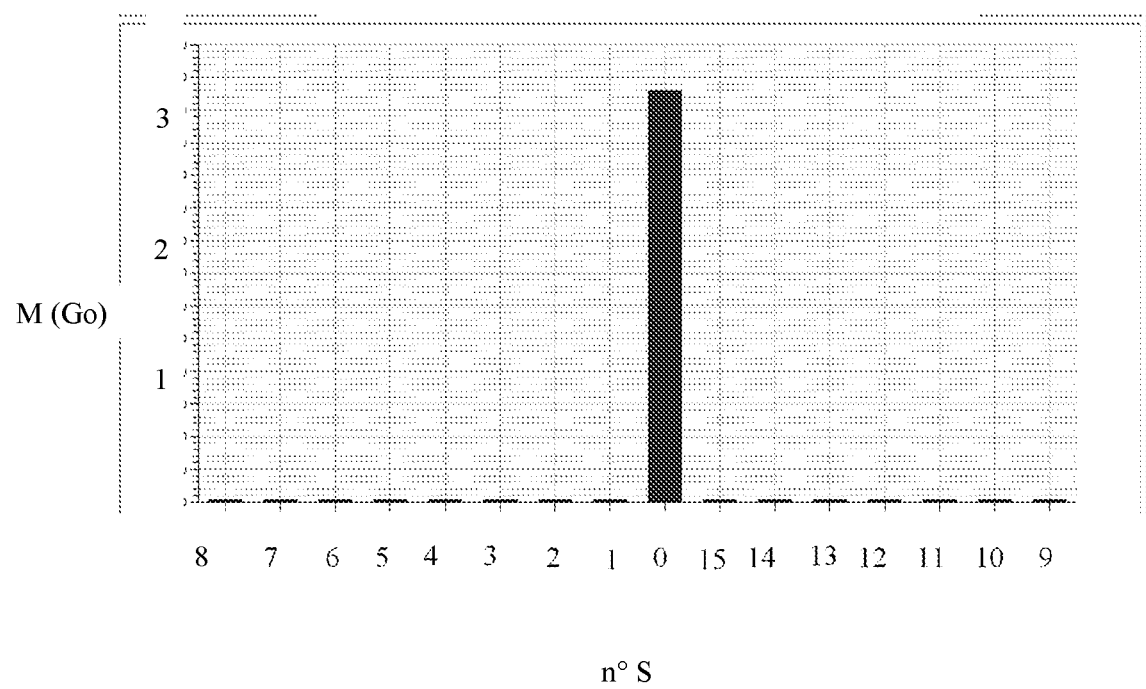
FIG. 4 is a histogram showing the memory use for the same example as FIG. 3 with the computer system according to one embodiment of the invention.

FIGS. 3 and 4 show, for example No. 3 in Table 1 (computing node with two eight-core Intel® Sandy Bridge processors), the memory used for a table of 3.2 GB. FIG. 3 corresponds to the use of the memory by a system and method according to the prior art (allocation of the table to each memory segment) and FIG. 4 corresponds to the use of the memory by a system and method according to the invention (allocation of the table to a single memory segment).

FIGS. 3 and 4 are histograms showing the number of the segment no S of the random-access memory on the abscissa. The random-access memory segments are numbered from 0 to 15. The ordinate of FIGS. 3 and 4 corresponds to the memory used M in GB. The use of 3.2 GB of memory on each of the memory segments is observed for the method according to the prior art (FIG. 3). Conversely, only one memory segment is used for the method according to the invention (FIG. 4).

These figures provide a good illustration of the gain in memory used provided by the invention, which makes it possible to limit the capacity of the random-access memory.

The invention claimed is:

1. A computer system for predicting at least one of a physical and chemical phenomenon, comprising:
    multicore processors providing parallel computing and a random-access memory including memory segments, the predicting of at least one physical and chemical phenomenon being performed by computations based on at least one table storing numerical data, and wherein the random-access memory comprises a single shared segment in which the at least one table of numerical data is stored, and each core of each processor is configured to communicate with the single shared segment to read the at least one table storing the numerical data to perform the computations for predicting the at least one physical and chemical phenomenon.

2. The system according to claim 1, wherein:
    the at least one of physical and chemical phenomenon is combustion and pollution emissions from a vehicle including an internal combustion engine.

3. The system according to claim 1, wherein the at least one table of numerical data is based on at least one of chemical kinetics code and flamelet computations representing structure of a flame.

4. The system according to claim 2, wherein the at least one table of numerical data is based on at least one of chemical kinetics code and flamelet computations representing structure of a flame.

5. The system according to claim 1, wherein:
    each core of each processor is configured to read the table of numerical data of the single shared segment by using a message-passing interface.

6. The system according to claim 1, wherein the system comprises means for providing parallel computations between at least one of the processors and the cores of the processors.

7. The system according to claim 2, wherein the system comprises means for providing parallel computations between at least one of the processors and the cores of the processors.

8. The system according to claim 3, wherein the system comprises means for providing parallel computations between at least one of the processors and the cores of the processors.

9. The system according to claim 5, wherein the system comprises means for providing parallel computations between at least one of the processors and the cores of the processors.

10. The system according to claim 1, wherein the processors are configured to run computational fluid dynamics codes for predicting at least one of the physical and chemical phenomenon.

11. A method for predicting at least one of a physical and a chemical phenomenon by use of the computer system according to claim 1 and a table of numerical data used for predicting the at least one of the physical and chemical phenomenon, comprising steps:
    a) allocating the table of numerical data to the single shared segment of the random-access memory; and
    b) predicting the at least one of physical and chemical phenomenon by running at least one of physical and chemical computations on a plurality of cores of the plurality of processors of the system by using the table of numerical data with each core communicating with the shared segment to read the table.

12. The method according to claim 11, wherein the at least one of the physical and chemical phenomenon is a combustion and pollution emission phenomenon of a vehicle having an internal combustion engine.

13. The method according to claim 11, including a prior step of generating the table of numerical data based on at least one of code for determining chemical kinetics and flamelet computation code for determining structure of a flame.

14. The method according to claim 12, including a prior step of generating the table of numerical data based on at least one of code for determining chemical kinetics and flamelet computation code for determining structure of a flame.

15. The method according to claim 11, comprising allocating an identifier to the single shared segment, the identifier is transmitted to the cores of the processors, and assigning a pointer from the processors to the shared segment by use of the identifier.

16. The method according to claim 11, comprising executing fluid dynamics computations on the cores of the processors to predict the at least one of physical and chemical phenomenon.

17. The method according to claim 11, comprising running the at least one of physical and chemical computations in parallel between at least one of the processors and the cores.

18. The method according to claim 11, the cores use a message-passing interface function to read the table of numerical data on the single shared segment.

* * * * *